(12) United States Patent
Trefler et al.

(10) Patent No.: US 8,335,704 B2
(45) Date of Patent: Dec. 18, 2012

(54) METHODS AND APPARATUS FOR WORK MANAGEMENT AND ROUTING

(75) Inventors: Alan Trefler, Brookline, MA (US); Andreas G. Hofmann, Cambridge, MA (US)

(73) Assignee: Pegasystems Inc., Cambridge, MA (US)

( * ) Notice: Subject to any disclaimer, the term of this patent is extended or adjusted under 35 U.S.C. 154(b) by 1151 days.

(21) Appl. No.: 11/046,211

(22) Filed: Jan. 28, 2005

(65) Prior Publication Data

US 2006/0173724 A1    Aug. 3, 2006

(51) Int. Cl.
*G06Q 10/00* (2006.01)
(52) U.S. Cl. ...................................................... 705/7.14
(58) Field of Classification Search .................. 705/7.14
See application file for complete search history.

(56) References Cited

U.S. PATENT DOCUMENTS

| | | | |
|---|---|---|---|
| 4,047,059 A | 9/1977 | Rosenthal |
| 4,344,142 A | 8/1982 | Diehr, II et al. |
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,077,491 A | 12/1991 | Heck et al. |

(Continued)

FOREIGN PATENT DOCUMENTS

DE    19911098 A1    12/1999

(Continued)

OTHER PUBLICATIONS

Yang, Bibo; Geunes, Joseph; O'Brien, William J.; "Resource-Constrained Project Scheduling: Past Work and New Directions". Apr. 2001.*

(Continued)

*Primary Examiner* — Peter Choi
(74) *Attorney, Agent, or Firm* — Nutter McClennen & Fish LLP; David J. Powsner

(57) ABSTRACT

Methods and apparatus for service-level based and/or skills-based assignment of a work item to one (or more) of a plurality of resources based on fitness, for example, of skills required by the former to those provided by the latter. Assignment takes into account the level of stress on the work item and/or resources, such that the number of resources fit for assignment varies as the level of stress varies. Systems according to the invention can be used, by way of example, to route a call or other request made by a customer to a service center. The requirements for processing the call (determined, for example, by an incoming call operator) are matched against the skill sets of available customer service agents, taking call and/or resource stress levels into account. For example, some implementations may match an incoming call having a low stress factor (e.g., a newly received call from a standard customer) to a smaller pool of agents with both required and desired skills, while assigning a call with a higher stress factor to a larger pool of agents with at least required skills. Other embodiments may match an incoming call having a low stress factor to the larger pool of agents having at least the required skills, while assigning a call with a higher stress factor (e.g., a call from a priority customer) to an agent from the smaller pool of agents who have both required and desired skills.

29 Claims, 6 Drawing Sheets

U.S. PATENT DOCUMENTS

| | | | |
|---|---|---|---|
| 5,093,794 A * | 3/1992 | Howie et al. | 700/100 |
| 5,119,465 A | 6/1992 | Jack et al. | |
| 5,129,043 A | 7/1992 | Yue | |
| 5,136,184 A | 8/1992 | Deevy | |
| 5,136,523 A | 8/1992 | Landers | |
| 5,140,671 A | 8/1992 | Hayes et al. | |
| 5,193,056 A | 3/1993 | Boes | |
| 5,199,068 A | 3/1993 | Cox | |
| 5,204,939 A | 4/1993 | Yamazaki et al. | |
| 5,228,116 A | 7/1993 | Harris et al. | |
| 5,259,766 A | 11/1993 | Sack et al. | |
| 5,262,941 A | 11/1993 | Saladin et al. | |
| 5,267,175 A | 11/1993 | Hooper | |
| 5,267,865 A | 12/1993 | Lee et al. | |
| 5,270,920 A | 12/1993 | Pearse et al. | |
| 5,276,359 A | 1/1994 | Chiang | |
| 5,276,885 A | 1/1994 | Milnes et al. | |
| 5,291,394 A * | 3/1994 | Chapman | 705/8 |
| 5,291,583 A | 3/1994 | Bapat | |
| 5,295,256 A | 3/1994 | Bapat | |
| 5,297,279 A | 3/1994 | Bannon et al. | |
| 5,301,270 A | 4/1994 | Steinberg et al. | |
| 5,310,349 A | 5/1994 | Daniels et al. | |
| 5,311,422 A | 5/1994 | Loftin et al. | |
| 5,326,270 A | 7/1994 | Ostby et al. | |
| 5,333,254 A | 7/1994 | Robertson | |
| 5,339,390 A | 8/1994 | Robertson et al. | |
| 5,353,229 A * | 10/1994 | Tanaka | 700/103 |
| 5,374,932 A | 12/1994 | Wyschogrod et al. | |
| 5,379,366 A | 1/1995 | Noyes | |
| 5,379,387 A | 1/1995 | Carlstedt et al. | |
| 5,381,332 A | 1/1995 | Wood | |
| 5,386,559 A | 1/1995 | Eisenberg et al. | |
| 5,395,243 A | 3/1995 | Lubin et al. | |
| 5,412,756 A | 5/1995 | Bauman et al. | |
| 5,421,011 A | 5/1995 | Camillone et al. | |
| 5,421,730 A | 6/1995 | Lasker, III et al. | |
| 5,446,397 A | 8/1995 | Yotsuyanagi | |
| 5,446,885 A | 8/1995 | Moore et al. | |
| 5,450,480 A | 9/1995 | Man et al. | |
| 5,463,682 A | 10/1995 | Fisher et al. | |
| 5,473,732 A | 12/1995 | Chang | |
| 5,477,170 A | 12/1995 | Yotsuyanagi | |
| 5,481,647 A | 1/1996 | Brody et al. | |
| 5,499,293 A | 3/1996 | Behram et al. | |
| 5,504,879 A | 4/1996 | Eisenberg et al. | |
| 5,512,849 A | 4/1996 | Wong | |
| 5,519,618 A | 5/1996 | Kastner et al. | |
| 5,537,590 A | 7/1996 | Amado | |
| 5,542,024 A | 7/1996 | Balint et al. | |
| 5,542,078 A | 7/1996 | Martel et al. | |
| 5,548,506 A | 8/1996 | Srinivasan | |
| 5,561,740 A | 10/1996 | Barrett et al. | |
| 5,579,223 A | 11/1996 | Raman | |
| 5,579,486 A | 11/1996 | Oprescu et al. | |
| 5,596,752 A | 1/1997 | Knudsen et al. | |
| 5,597,312 A | 1/1997 | Bloom et al. | |
| 5,608,789 A | 3/1997 | Fisher et al. | |
| 5,627,979 A | 5/1997 | Chang et al. | |
| 5,630,127 A | 5/1997 | Moore et al. | |
| 5,649,192 A | 7/1997 | Stucky | |
| 5,655,118 A | 8/1997 | Heindel et al. | |
| 5,664,206 A | 9/1997 | Murow et al. | |
| 5,678,039 A | 10/1997 | Hinks et al. | |
| 5,715,450 A | 2/1998 | Ambrose et al. | |
| 5,732,192 A | 3/1998 | Malin et al. | |
| 5,754,740 A | 5/1998 | Fukuoka et al. | |
| 5,761,063 A | 6/1998 | Jannette et al. | |
| 5,761,673 A | 6/1998 | Bookman et al. | |
| 5,765,140 A | 6/1998 | Knudson et al. | |
| 5,768,480 A | 6/1998 | Crawford, Jr. et al. | |
| 5,788,504 A | 8/1998 | Rice et al. | |
| 5,795,155 A | 8/1998 | Morrel-Samuels | |
| 5,809,212 A | 9/1998 | Shasha | |
| 5,815,415 A | 9/1998 | Bentley et al. | |
| 5,819,257 A | 10/1998 | Monge et al. | |
| 5,822,780 A | 10/1998 | Schutzman | |
| 5,825,260 A | 10/1998 | Ludwig et al. | |
| 5,826,077 A | 10/1998 | Blakeley et al. | |
| 5,826,239 A | 10/1998 | Du et al. | |
| 5,826,250 A | 10/1998 | Trefler | |
| 5,826,252 A | 10/1998 | Wolters, Jr. et al. | |
| 5,829,983 A | 11/1998 | Koyama et al. | |
| 5,832,483 A | 11/1998 | Barker | |
| 5,841,673 A | 11/1998 | Kobayashi et al. | |
| 5,873,096 A | 2/1999 | Lim et al. | |
| 5,875,334 A | 2/1999 | Chow et al. | |
| 5,875,441 A | 2/1999 | Nakatsuyama et al. | |
| 5,880,614 A | 3/1999 | Zinke et al. | |
| 5,880,742 A | 3/1999 | Rao et al. | |
| 5,886,546 A | 3/1999 | Hwang | |
| 5,890,146 A | 3/1999 | Wavish et al. | |
| 5,890,166 A | 3/1999 | Eisenberg et al. | |
| 5,907,490 A * | 5/1999 | Oliver | 700/90 |
| 5,907,837 A | 5/1999 | Ferrel et al. | |
| 5,910,748 A | 6/1999 | Reffay et al. | |
| 5,918,222 A | 6/1999 | Fukui et al. | |
| 5,920,717 A | 7/1999 | Noda | |
| 5,930,795 A | 7/1999 | Chen et al. | |
| 5,945,852 A | 8/1999 | Kosiec | |
| 5,974,441 A | 10/1999 | Rogers et al. | |
| 5,974,443 A | 10/1999 | Jeske | |
| 5,978,566 A | 11/1999 | Plank et al. | |
| 5,983,267 A | 11/1999 | Shklar et al. | |
| 5,987,415 A | 11/1999 | Breese et al. | |
| 5,990,742 A | 11/1999 | Suzuki | |
| 5,995,948 A | 11/1999 | Whitford et al. | |
| 5,995,958 A | 11/1999 | Xu | |
| 6,008,673 A | 12/1999 | Glass et al. | |
| 6,012,098 A | 1/2000 | Bayeh et al. | |
| 6,020,768 A | 2/2000 | Lim | |
| 6,023,704 A | 2/2000 | Gerard et al. | |
| 6,023,714 A | 2/2000 | Hill et al. | |
| 6,023,717 A | 2/2000 | Argyroudis | |
| 6,028,457 A | 2/2000 | Tihanyi | |
| 6,037,890 A | 3/2000 | Glass et al. | |
| 6,044,373 A | 3/2000 | Gladney et al. | |
| 6,044,466 A | 3/2000 | Anand et al. | |
| 6,078,982 A | 6/2000 | Du et al. | |
| 6,085,188 A | 7/2000 | Bachmann et al. | |
| 6,085,198 A | 7/2000 | Skinner et al. | |
| 6,091,226 A | 7/2000 | Amano | |
| 6,092,036 A | 7/2000 | Hamann | |
| 6,092,083 A | 7/2000 | Brodersen et al. | |
| 6,094,652 A | 7/2000 | Faisal | |
| 6,105,035 A | 8/2000 | Monge et al. | |
| 6,122,632 A | 9/2000 | Botts et al. | |
| 6,125,363 A | 9/2000 | Buzzeo et al. | |
| 6,130,679 A | 10/2000 | Chen et al. | |
| 6,137,797 A | 10/2000 | Bass et al. | |
| 6,144,997 A | 11/2000 | Lamming et al. | |
| 6,151,595 A | 11/2000 | Pirolli et al. | |
| 6,151,624 A | 11/2000 | Teare et al. | |
| 6,154,738 A | 11/2000 | Call | |
| 6,167,441 A | 12/2000 | Himmel | |
| 6,177,932 B1 | 1/2001 | Galdes et al. | |
| 6,185,516 B1 | 2/2001 | Hardin et al. | |
| 6,185,534 B1 | 2/2001 | Breese et al. | |
| 6,192,371 B1 | 2/2001 | Schultz | |
| 6,194,919 B1 | 2/2001 | Park | |
| 6,212,502 B1 | 4/2001 | Ball et al. | |
| 6,216,135 B1 | 4/2001 | Brodersen et al. | |
| 6,233,617 B1 | 5/2001 | Rothwein et al. | |
| 6,240,417 B1 | 5/2001 | Eastwick et al. | |
| 6,243,713 B1 | 6/2001 | Nelson et al. | |
| 6,246,320 B1 | 6/2001 | Monroe | |
| 6,275,073 B1 | 8/2001 | Tokuhiro | |
| 6,275,790 B1 | 8/2001 | Yamamoto et al. | |
| 6,300,947 B1 | 10/2001 | Kanevsky | |
| 6,308,163 B1 | 10/2001 | Du et al. | |
| 6,314,415 B1 | 11/2001 | Mukherjee | |
| 6,324,693 B1 | 11/2001 | Brodersen et al. | |
| 6,330,554 B1 | 12/2001 | Altschuler et al. | |
| 6,338,074 B1 | 1/2002 | Poindexter et al. | |
| 6,341,277 B1 | 1/2002 | Coden et al. | |
| 6,341,293 B1 | 1/2002 | Hennessey | |
| 6,349,238 B1 * | 2/2002 | Gabbita et al. | 700/101 |

| | | | |
|---|---|---|---|
| 6,351,734 B1 * | 2/2002 | Lautzenheiser et al. ............ 705/8 |
| 6,359,633 B1 | 3/2002 | Balasubramaniam et al. |
| 6,369,819 B1 | 4/2002 | Pitkow et al. |
| 6,380,910 B1 | 4/2002 | Moustakas et al. |
| 6,381,738 B1 | 4/2002 | Choi et al. |
| 6,389,460 B1 | 5/2002 | Stewart et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 * | 7/2002 | Wolfinger et al. ............... 705/8 |
| 6,415,283 B1 | 7/2002 | Conklin |
| 6,418,448 B1 | 7/2002 | Sarkar |
| 6,426,723 B1 | 7/2002 | Smith et al. |
| 6,429,870 B1 | 8/2002 | Chen et al. |
| 6,437,799 B1 | 8/2002 | Shinomi et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,463,440 B1 | 10/2002 | Hind et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,899 B1 | 3/2003 | Kraft et al. |
| 6,530,079 B1 | 3/2003 | Choi et al. |
| 6,539,374 B2 | 3/2003 | Jung |
| 6,542,912 B2 | 4/2003 | Meltzer et al. |
| 6,546,406 B1 | 4/2003 | DeRose et al. |
| 6,549,904 B1 | 4/2003 | Ortega et al. |
| 6,556,983 B1 | 4/2003 | Altschuler et al. |
| 6,556,985 B1 | 4/2003 | Karch |
| 6,560,592 B1 | 5/2003 | Reid et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal et al. |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Chen et al. |
| RE38,633 E * | 10/2004 | Srinivasan ................ 707/10 |
| 6,804,330 B1 | 10/2004 | Jones et al. |
| 6,820,082 B1 | 11/2004 | Cook et al. |
| 6,829,655 B1 | 12/2004 | Huang et al. |
| 6,831,688 B2 | 12/2004 | Cras et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 * | 10/2005 | Kalantar et al. ............ 705/50 |
| 6,956,845 B2 | 10/2005 | Baker et al. |
| 6,959,432 B2 | 10/2005 | Crocker et al. |
| 6,961,725 B2 | 11/2005 | Yuan et al. |
| 6,965,889 B2 | 11/2005 | Serrano-Morales et al. |
| 6,976,144 B1 | 12/2005 | Trefler et al. |
| 6,985,912 B2 | 1/2006 | Mullins et al. |
| 7,020,869 B2 | 3/2006 | Abrari et al. |
| 7,028,225 B2 | 4/2006 | Maso et al. |
| 7,031,901 B2 | 4/2006 | Abu El Ata |
| 7,058,367 B1 | 6/2006 | Luo et al. |
| 7,058,637 B2 | 6/2006 | Britton et al. |
| 7,076,558 B1 | 7/2006 | Dunn |
| 7,089,193 B2 * | 8/2006 | Newbold ................ 705/9 |
| 7,103,173 B2 * | 9/2006 | Rodenbusch et al. ..... 379/266.07 |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,406,475 B2 | 7/2008 | Dorne et al. |
| 7,412,388 B2 | 8/2008 | Dalal et al. |
| 7,505,827 B1 * | 3/2009 | Boddy et al. ................ 700/100 |
| 7,536,294 B2 | 5/2009 | Stanz et al. |
| 7,555,645 B2 | 6/2009 | Vissapragada |
| 7,574,494 B1 | 8/2009 | Mayernick et al. |
| 7,596,504 B2 * | 9/2009 | Hughes et al. ................ 705/9 |
| 7,640,222 B2 | 12/2009 | Trefler |
| 7,665,063 B1 | 2/2010 | Hofmann et al. |
| 7,711,919 B2 | 5/2010 | Trefler et al. |
| 7,983,895 B2 | 7/2011 | McEntee et al. |
| 8,037,329 B2 | 10/2011 | Leech et al. |
| 8,073,802 B2 | 12/2011 | Trefler |
| 8,250,525 B2 | 8/2012 | Khatutsky |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2002/0010855 A1 | 1/2002 | Reshef et al. |
| 2002/0013804 A1 | 1/2002 | Gideon |
| 2002/0029161 A1 * | 3/2002 | Brodersen et al. ............... 705/9 |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |

| Publication No. | Date | Inventor(s) |
|---|---|---|
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0184610 A1 | 12/2002 | Chong et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1* | 4/2003 | Elzinga et al. .................... 705/8 |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0109951 A1 | 6/2003 | Hsiung et al. |
| 2003/0135358 A1 | 7/2003 | Lissauer et al. |
| 2003/0191626 A1 | 10/2003 | Al-Onaizan et al. |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0024603 A1 | 2/2004 | Mahoney et al. |
| 2004/0034651 A1 | 2/2004 | Gupta et al. |
| 2004/0049509 A1 | 3/2004 | Keller et al. |
| 2004/0054610 A1 | 3/2004 | Amstutz et al. |
| 2004/0088199 A1 | 5/2004 | Childress et al. |
| 2004/0103014 A1* | 5/2004 | Teegan et al. .................... 705/8 |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0104628 A1 | 5/2005 | Tanzawa et al. |
| 2005/0125683 A1 | 6/2005 | Matsuyama et al. |
| 2005/0165823 A1 | 7/2005 | Ondrusek et al. |
| 2005/0216235 A1 | 9/2005 | Butt et al. |
| 2005/0234882 A1 | 10/2005 | Bennett et al. |
| 2005/0288920 A1 | 12/2005 | Green et al. |
| 2006/0020783 A1 | 1/2006 | Fisher |
| 2006/0041861 A1 | 2/2006 | Trefler et al. |
| 2006/0063138 A1 | 3/2006 | Loff et al. |
| 2006/0064486 A1 | 3/2006 | Baron et al. |
| 2006/0080082 A1 | 4/2006 | Ravindra et al. |
| 2006/0100847 A1 | 5/2006 | McEntee et al. |
| 2006/0139312 A1 | 6/2006 | Sinclair et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0218166 A1 | 9/2006 | Myers et al. |
| 2006/0271920 A1 | 11/2006 | Abouelsaadat |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0094199 A1 | 4/2007 | Deshpande et al. |
| 2007/0130130 A1 | 6/2007 | Chan et al. |
| 2007/0203756 A1 | 8/2007 | Sears et al. |
| 2007/0208553 A1 | 9/2007 | Hastings et al. |
| 2007/0233902 A1 | 10/2007 | Trefler et al. |
| 2007/0239646 A1 | 10/2007 | Trefler |
| 2007/0294644 A1 | 12/2007 | Yost |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0184230 A1 | 7/2008 | Leech et al. |
| 2008/0208785 A1 | 8/2008 | Trefler et al. |
| 2008/0216055 A1 | 9/2008 | Khatutsky |
| 2009/0132232 A1 | 5/2009 | Trefler |
| 2010/0088266 A1 | 4/2010 | Trefler |
| 2010/0107137 A1 | 4/2010 | Trefler et al. |

FOREIGN PATENT DOCUMENTS

| | | |
|---|---|---|
| EP | 0669717 A1 | 8/1995 |
| EP | 996916 A1 | 5/2000 |
| EP | 1015997 A2 | 7/2000 |
| EP | 1019807 A2 | 7/2000 |
| EP | 1073955 A1 | 2/2001 |
| EP | 1073992 A1 | 2/2001 |
| EP | 1135723 A1 | 9/2001 |
| EP | 1163604 A2 | 12/2001 |
| EP | 1183636 A1 | 3/2002 |
| EP | 1196882 A1 | 4/2002 |
| EP | 1203310 A1 | 5/2002 |
| EP | 1208482 A1 | 5/2002 |
| EP | 1212668 A2 | 6/2002 |
| EP | 1240592 A1 | 9/2002 |
| EP | 1277102 A2 | 1/2003 |
| EP | 1277119 A1 | 1/2003 |
| EP | 1277120 A1 | 1/2003 |
| EP | 1277153 A1 | 1/2003 |
| EP | 1277155 A1 | 1/2003 |
| EP | 1277329 A1 | 1/2003 |
| EP | 1374083 A1 | 1/2004 |
| EP | 1382030 A2 | 1/2004 |
| EP | 1386241 A1 | 2/2004 |
| EP | 1393172 A2 | 3/2004 |
| EP | 1393188 A1 | 3/2004 |
| EP | 1402336 A2 | 3/2004 |
| EP | 1407384 A1 | 4/2004 |
| EP | 1 430 396 A1 | 6/2004 |
| EP | 1438649 A1 | 7/2004 |
| EP | 1438654 A1 | 7/2004 |
| EP | 1438672 A1 | 7/2004 |
| EP | 1483685 A1 | 12/2004 |
| EP | 1490747 A1 | 12/2004 |
| EP | 1490809 A1 | 12/2004 |
| EP | 1492232 A1 | 12/2004 |
| EP | 1782183 A2 | 5/2007 |
| EP | 1830312 | 9/2007 |
| EP | 1840803 | 10/2007 |
| EP | 2115581 A1 | 11/2009 |
| WO | WO-9838564 | 9/1998 |
| WO | WO-9840807 | 9/1998 |
| WO | WO-9905632 | 2/1999 |
| WO | WO-9945465 | 9/1999 |
| WO | WO-9950784 | 10/1999 |
| WO | WO-0033187 | 6/2000 |
| WO | WO-0033217 | 6/2000 |
| WO | WO-0033226 | 6/2000 |
| WO | WO-0033235 | 6/2000 |
| WO | WO-0033238 | 6/2000 |
| WO | WO-0052553 | 9/2000 |
| WO | WO-0052603 | 9/2000 |
| WO | WO-0140958 | 6/2001 |
| WO | WO-0175610 | 10/2001 |
| WO | WO-0175614 | 10/2001 |
| WO | WO-0175747 | 10/2001 |
| WO | WO-0175748 | 10/2001 |

| | | |
|---|---|---|
| WO | WO-0176206 | 10/2001 |
| WO | WO-0177787 | 10/2001 |
| WO | WO-0179994 | 10/2001 |
| WO | WO-0221254 | 3/2002 |
| WO | WO-0244947 | 6/2002 |
| WO | 02/056249 A2 | 7/2002 |
| WO | WO-02080006 | 10/2002 |
| WO | WO-02080015 | 10/2002 |
| WO | WO-02082300 | 10/2002 |
| WO | WO-02084925 | 10/2002 |
| WO | WO-02088869 | 11/2002 |
| WO | WO-02091346 | 11/2002 |
| WO | WO-02101517 | 12/2002 |
| WO | WO-02103576 | 12/2002 |
| WO | WO-03021393 | 3/2003 |
| WO | WO-03029923 | 4/2003 |
| WO | WO-03029955 | 4/2003 |
| WO | WO-03030005 | 4/2003 |
| WO | WO-03030013 | 4/2003 |
| WO | WO-03030014 | 4/2003 |
| WO | WO-03058504 | 7/2003 |
| WO | WO-03069500 | 8/2003 |
| WO | WO-03071380 | 8/2003 |
| WO | WO-03071388 | 8/2003 |
| WO | WO-03073319 | 9/2003 |
| WO | WO-03077139 | 9/2003 |
| WO | WO-03085503 | 10/2003 |
| WO | WO-03085580 | 10/2003 |
| WO | WO-2004001613 | 12/2003 |
| WO | WO-2004003684 | 1/2004 |
| WO | WO-2004003766 | 1/2004 |
| WO | WO-2004003885 | 1/2004 |
| WO | WO-2004046882 | 6/2004 |
| WO | WO-2004061815 | 7/2004 |
| WO | WO-2004086197 | 10/2004 |
| WO | WO-2004086198 | 10/2004 |
| WO | WO-2004095207 | 11/2004 |
| WO | WO-2004095208 | 11/2004 |
| WO | WO-2004114147 | 12/2004 |
| WO | WO-2005001627 | 1/2005 |
| WO | WO-2005003888 | 1/2005 |
| WO | WO-2005010645 | 2/2005 |
| WO | WO-2005117549 | 12/2005 |
| WO | 2006081536 A2 | 8/2006 |
| WO | 2008109441 A1 | 9/2008 |
| WO | 2009097384 A1 | 8/2009 |

OTHER PUBLICATIONS

McConnell, Steven C. "Brooks' Law Repealed". Nov./Dec. 1999. IEEE Software.*

Buyya, Rajkumar; Abramson, David; Giddy, Jonathan; Stockinger, Heinz. "Economic Models for Resource Management and Scheduling in Grid Computing". 2002. Concurrency and Computation: Practice and Experience. Volume 14. pp. 1507-1542.*

Cheng, Cheng-Chung; Smith, Stephen F.; "A Constraint Satisfaction Approach to Makespan Scheduling". 1996. AIPS 1996 Proceedings.*

Cheng, Cheng-Chung; Smith, Stephen F.; "Applying Contraint Satisfaction Techniques to Job Shop Scheduling". 1997. Annals of Operations Research. pp. 327-357.*

Reinertsen, Don. "Is It Always a Bad Idea to Add Resources to a Late Project?". Oct. 30, 2000. Electronic Design. Volume 48, Issue 22.*

International Search Report, Jul. 21, 2008, PCT/US06/03160.

Anonymous "How SmartForms for Fair Blaze Advisor works", Fair Issac White Paper, http://www.FAIRISAAC.COM/, Oct. 31, 2005.

Busse, Ralph et al., "Declarative and Procedural Object Oriented Views", 1998, IEEE.

Cochrane, Roberta et al., "Integrating Triggers and Declarative Constraints in SQL", p. 567-578, Proceedings of the 22nd VLDB Conference Mumbai (Bombay), India, 1996.

Francisco, S. et al, "Rule-Based Web Page Generation" Proceedings of the 2nd Workshop on Adaptive Hypertext and Hypermedia, Hypertext'98, Jun. 24, 1998.

Manghi, Paolo et. al. "Hybrid Applications Over XML: Integrating the Procedural and Declarative Approaches", 2002 ACM.

Mecca, G. et al. " Cut and Paste", ACM, 1999.

Schiefelbein, Mark A Backbase Ajax Front-end for J2EE Applications, Internet Article, http:/dev2dev.bea.com/1pt/a/433>, Aug. 29, 2005.

"The Hungarian Method for the Assignment Problem," Naval Research Logistics Quarterly, 2 (1955), pp. 83-97.

B. Thuraisingham, "From Rules to Frames and Frames to Rules," AI Expert, pp. 31-39, Oct. 1989.

D. Burleson, "Adding behaviors to relational databases," DBMS, vol. 8(10), p. 68(5), Sep. 1995.

E. Bertino and P. Foscoli, "Index Organizations for Object-Oriented Database Systems," IEEE Trans. on Knowledge and Data Engineering, vol. 7(2), pp. 193-209, Apr. 1995.

F Maryanski, et al., "The Data Model Compiler: A Tool for Generating Object-Oriented Database Systems," 1986 Int'l. Workshop onObject-Oriented Database Systems, pp. 73-84, Sep. 1986.

H.A. Kuno and E.A. Rundensteiner, "Augmented Inherited Multi-Index Structure for Maintenance of Materialized Path Query Views," Proc. Sixth Int'l. Workshop on Research Issues in Data Engineering, pp. 128-137, Feb. 1996.

L.G. DeMichiel, et al., "Polyglot: Extensions to Relational Databases for Sharable Types and Functions in a Multi-Language Environment," Proc. Ninth Int'l. Conf. on Data Engineering, pp. 651-660, Apr. 1993.

M. Riccuiti, "Oracle 8.0 on the way with objects: upgrade will also build in multidimensional engine," InfoWorld, V. 17(39), p. 16, Sep. 1995 (abstract).

M. Stonebraker, "The Integration of Rule Systems and Database Systems," IEEE Trans. on Knowledge and Data Engineering, vol. 4(5), pp. 415-423, Oct. 1992.

P. Morizet-Mahoudeaux, "A Hierarchy of Network-Based Knowledge Systems," IEEE Trans. on Systems, Man, and Cybernetics, vol. 21(5), pp. 1184-1191, Sep. 1991.

S. Danforth, "Integrating Object and Relational Technologies," Proc. Sixteenth Annual Int'l. Computer Software and Applications Conf., pp. 225-226, Sep. 1992 (abstract).

S. Salvini and M.H. Williams, "Knowledge Management for Expert Systems," IEE Colloquium on 'Knowledge Engineering', 3 pages, May 1990.

T. Chan and W. Hwang, "Towards Integrating Logic, Object, Frame, and Production," Proc. Fourth Int'l. Conf. on Software Engineering and Knowledge Engineering, pp. 463-469, Jun. 1992.

T. Sellis, et al., "Coupling Production Systems and Database Systems: A Homogeneous Approach," IEEE Trans. on Knowledge and Data Engineering, vol. 5(2), pp. 240-256, Apr. 1993.

V.M. Markowitz and A. Shoshani, "Object Queries over Relational Databases: Language, Implementation, and Applications," Proc. Ninth Int'l. Conf. On Data Engineering, pp. 71-80, Apr. 1993.

W. Kim, "Object-Oriented Databases: Definition and Research Directions," IEEE Trans. on Knowledge and Data Engineering, vol. 2(3) pp. 327-341, Sep. 1990.

W. Sun, et al., "Supporting Inheritance in Relational Database Systems," Proc. Fourth Int'l. Conf. on Software Engineering and Knowledge Engineering, pp. 511-518, Jun. 1992.

Y.-M. Shyy and S.Y.W. Su, "Refinement Preservation for Rule Selection in Active Object-Oriented Database Systems," Proc. Fourth Int'l. Workshop on Research Issues in Data Engineering, pp. 115-123, Feb. 1994.

European Search Report for Application No. 05755530.2, dated Mar. 26, 2012 (3 pages).

European Office Action issued Aug. 31, 2012 for Application No. 05755530.2 (4 Pages).

European Office Action issued Jul. 9, 2012 for Application No. 07250844.3 (8 Pages).

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.

Jones, S. et al., "A User-Centered Approach to Functions in Excel," International Conference on Functional Programming, Uppsala, Jun. 30, 2003, pp. 1-12.

Lippert, Eric, "Fabulous Adventures In Coding: Metaprogramming, Toast and the Future of Development Tools," Microsoft.com Blog, MSDN Home, published Mar. 4, 2004, 6 pgs.

M. Riccuiti, "Oracle 8.0 on the way with objects: upgrade will also build in multidimensional engine," InfoWorld, V. 17 (39), p. 16(1), Sep. 1995.

Smedley, T.J. et al., "Expanding the Utility of Spreadsheets Through the Integration of Visual Programming and User Interface Objects," School of Computer Science, Technical University of Nova Scotia, ACM, 1996; pp: 148-155.

Vranes, S. "Integrating Multiple Paradigms within the Blackboard Framework," IEEE Transactions on Software Engineering, vol. 21, No. 3, Mar. 1995, pp: 244-262.

Communication for European Patent Application No. 07250844.3 enclosing European Search Report, dated Jul. 11, 2007.

International Search Report & Written Opinion for PCT/US09/32341, mailed Mar. 11, 2009.

International Search Report & Written Opinion for PCT/US06/03160, mailed Jul. 21, 2008.

International Search Report for PCT/US08/55503, mailed Jul. 28, 2008.

International Search Report for PCT/US05/018599, dated May 15, 2007.

International Preliminary Report on Patentability for PCT/US06/03160, dated Apr. 9, 2009.

International Preliminary Report on Patentability for PCT/US2005/018599, dated Jun. 5, 2007.

International Preliminary Report on Patentability for PCT/US2008/05503, mailed Sep. 17, 2009.

International Preliminary Report on Patentability for PCT/US2009/032341, mailed Aug. 12, 2010.

Communication for European Patent Application No. 07250848.4, dated May 29, 2008.

Communication for European Patent Application No. 07250848.4, dated Aug. 13, 2007 (EESR enclosed).

Communication for European Patent Application No. 07250844.3, dated Mar. 28, 2008.

Communication for European Patent Application No. 05755530.2, dated Sep. 6, 2007.

Communication for European Patent Application No. 08731127.0, dated Oct. 13, 2009.

Damerau, F.J., Problems and some solutions in customization of natural language database front ends. ACM Transactions on Information Systems, vol. 3, No. 2, Apr. 1, 1985, pp. 165-184.

Johnson et al., Sharing and resuing rules-a feature comparison of five expert system shells. IEEE Expert, IEEE Services Center, New York, NY, vol. 9, No. 3, Jun. 1, 1994, pp. 3-17.

* cited by examiner

|     | WI-1 | WI-2 | WI-3 | WI-4 |
|-----|------|------|------|------|
| R-1 | 14   | 5    | 7    | 24   |
| R-2 | 8    | 10   | 3    | 5    |
| R-3 | 6    | 6    | 15   | 12   |
| R-4 | 10   | 8    | 10   | 4    |

| Pair\Service Level | desired-preferred | desired-sec. | desired-tert. | required-preferred | required-sec. | required-tert. |
|---|---|---|---|---|---|---|
| Goal | 100 | 50 | 20 | 0 | 0 | 0 |
| Deadline | 100 | 50 | 20 | 100 | 50 | 20 |
| Past | 1000 | 300 | 100 | 0 | 0 | 0 |

Figure 7

METHODS AND APPARATUS FOR WORK MANAGEMENT AND ROUTING

BACKGROUND OF THE INVENTION

The invention pertains to digital data processing and, more particularly, to automated methods and apparatus for managing and routing work. The invention has application, by way of non-limiting example, in call service centers and in other applications requiring routing and/or assignment of tasks to resources.

Work can be thought of, by way of non-limiting example, as consisting of individual work items that are subject to a workflow that solves a particular problem. A resource is a person, system or a piece of equipment, by way of further example, that has a capacity for work. Intelligent routing, assignment and/or work management (sometimes referred to below collectively as "routing") of work items to resources is a critically important problem in today's large and complex business environments.

Regardless of the specifics, routing problems share the following characteristics: there may be a large number of tasks (e.g., many call service center customers waiting in queues for service); workflows are often complex and may not be highly differentiated; available resources typically vary greatly in level of skill, and the more skilled or apt resources are typically scarce. The bottom line in many business applications, at least, is that customers expect fast, efficient service, so routing decisions have to be good and have to be made quickly. They also have to be effectively managed in light of evolving deadlines and circumstances.

Computer based systems for assigning work to resources are well known in the art. Such systems include discrete-parts manufacturing scheduling systems, batch process scheduling systems, optimization systems for matching energy producers with consumers, and call center workflow routers. Simple systems of this type consider one work item at a time; they take the next work item from a queue, search for a resource that is capable of performing the work, and make the assignment.

The advantages of such a simple system are that it is easy to implement, and that it makes fast decisions. The main drawback of such a system is that it can easily make bad decisions. The resource assigned in this simple way may be better utilized if it were assigned to a work item further back in the queue. Thus, more sophisticated systems consider multiple work items at the same time. Assignments are made taking into account costs and capacities of resources, so that the cheapest resources are used whenever possible. This results in significantly better decisions, than those from the most simple system. However, there are still problems that more sophisticated systems in the prior art do not properly address.

An object of this invention is to provide improved methods and systems for routing (and/or assigning) items to resources.

A further object is to provide such methods and systems for managing a pool of assigned items to pursue continued optimizations.

A related object is to provide such methods and systems as facilitate the ongoing management, e.g., reassignment, of items as deadlines and other service levels are passed.

Another object of the invention is to provide such methods and apparatus for service level driven skills-based routing.

Another more particular object of the invention is to provide such methods and systems as achieve optimal assignment of work items to resources.

Still another object of the invention is to provide such methods and systems as can be applied in a range of applications, business-related or otherwise.

Still other objects are to provide such methods and systems as can be implemented on a variety of platforms and without undue expense or resource consumption.

SUMMARY OF THE INVENTION

The foregoing are among the objects achieved by the invention which provides, in one aspect, improved methods and apparatus for skills-based routing. These assign a work item to one (or more) of a plurality of resources based on fitness, for example, of skills required by the former to those provided by the latter. Assignment takes into account the level of stress on the work item and/or resources, such that the number of resources—or size of the resource pool—fit for assignment varies as the level of stress varies. Moreover, as the level of stress changes (for example, increasing as a result of a missed goal deadline) the work item can be evaluated for reassignment to other resources.

Systems according to the invention can be used, by way of example, to route a call or other request made by a customer to a service center. The requirements for processing the call (determined, for example, by an incoming call operator) are matched against the skill sets of available customer service agents, taking call and/or resource stress levels into account. In some embodiments of the invention, the pool size may increase in size as stress levels go higher, while in other embodiments, it may get smaller.

For example, some implementations may match an incoming call having a low stress factor (e.g., a newly received call from a standard customer) to a smaller pool of agents with both required and desired skills, while assigning a call with a higher stress factor to a larger pool of agents with at least required skills. Other embodiments may match an incoming call having a low stress factor to the larger pool of agents having at least the required skills, while assigning a call with a higher stress factor (e.g., a call from a priority customer) to an agent from the smaller pool of agents who have both required and desired skills.

To give a few examples, a system according to the invention can assign a newly received technical support call from a native German-speaking customer to the next available agent from a pool of service agents who also speak native German and who are expected to become available (e.g., from handling prior calls) within ten minutes. If the call is from a priority customer, on the other hand, the system can assign the call to a larger pool of service agents who are proficient in German—though not necessarily native German speakers—who are expected to become available more quickly. Alternatively, the system can assign the priority customer's call to a smaller pool of agents who are proficient in German and who have particular expertise in the class of problem experienced by the caller. Still further alternatives provide for assignment of the priority customer's call "out of band," e.g., to a CEO, vice president, or other person or thing who, though not intended to address the caller's problem directly, can provide assurances that it will be handled expertly, as quickly as possible, and so forth.

Related aspects of the invention provide methods as described above in which at least selected resources are assigned skill levels indicating their respective proficiencies with respect to a given skill. Likewise, resources can have skill preferences, e.g., identifying skills the use of which is preferred (e.g., by the resource himself, herself or itself). Moreover, work items can require skill levels.

One or more of the foregoing can be taken into account when the resources are evaluated for assignment to the work items. In the example above, for example, calls with low stress factors may be assigned to service agents who have the required proficiency at a given skill and who prefer (or whom are preferred for) handling the respective types of calls. Calls with high stress factors, on the other hand, may be assigned among a larger pool of service agents with sufficient proficiency at the requisite task, e.g., regardless of whether they prefer (or are preferred) to handle the calls.

The invention provides, in other aspects, methods as described above in which work items are associated with both desired and required skills. By way of example, a bilingual caller to a service center may have a question regarding detailed operation of a specific product. A skill required of an agent assigned to handling the call is knowledge of the product and basic proficiency in the language. A desired skill is native proficiency in the caller's language of choice.

Other aspects of the invention provide methods as described above in which the completion status of work items are taken into account as a stress factor in assigning resources. For example, work items that will be completed by a first deadline (e.g., a goal deadline) can have lower stress factor. Those that will not be completed until a second deadline (e.g., a due deadline), a higher stress factor. And, those that will not be completed until after the second deadline, a still higher factor. Using a foreign language translation service as an example, an incoming technical translation received early has a low stress factor and can be assigned to any available translator among the pool of those having appropriate language skills (i.e., a required skill) and technical background (i.e., a preferred skill). A late arriving job on the other hand has a higher stress factor and may be assigned among a pool of translators simply having necessary language skills, thereby, insuring that the job will be completed by deadline.

Related aspects of the invention provide for reevaluation and assignment of work items, e.g., as they approach and pass deadlines. Continuing the above example, the translation job received from a client early can be "deskilled," i.e., reassigned among the larger pool simply having the required language skills, e.g., if or as the first, goal deadline is passed. Alternatively, the job can be reassigned among a small pool of translators who have not only the required language skills and preferred technical skills, but who also have a complimentary skill (such as previous experience with client or in the specific technical field covered by the translation). Likewise, if and as first or subsequent deadlines are passed, the job can be assigned out of band, e.g., to a CEO, who can provide necessarily explanations and/or facilitate execution of the job.

Further related aspects of the invention provide methods as described above in which resource utilization is taken into account in assigning resources to work items. These factors can be a measure of a utilization level of each of the plurality of resources with respect to its utilization capacity or capacities and can identify a complimentary stress level for each resource. For example, resources in use at or below a maximum utilization capacity can have a lower stress factor. Those in use above that capacity but below an emergency capacity can have a higher stress factor. Resources in use above the emergency capacity can have a still higher stress factor. In the example above, regular and/or overtime hours can provide a basis for determining resource stress factors used in assigning translators to incoming jobs.

Further aspects of the invention provide methods as described above in which an optimization, which utilizes a cost function based on a matrix of values of the respective fitnesses, is used to assign each of a plurality of work items to one (or more) of a plurality of resources.

Still further aspects of the invention provide digital data processing and other systems operating in accord with the methods summarized above.

These and other aspects of the invention are evident in the drawings and in the description that follows.

BRIEF DESCRIPTION OF THE ILLUSTRATED EMBODIMENT

A more complete understanding of the invention may be attained by reference to the drawings, in which:

FIG. 7 depicts a skill match factor table in a system according to the invention.

DETAILED DESCRIPTION OF THE ILLUSTRATED EMBODIMENT

Figure 1:
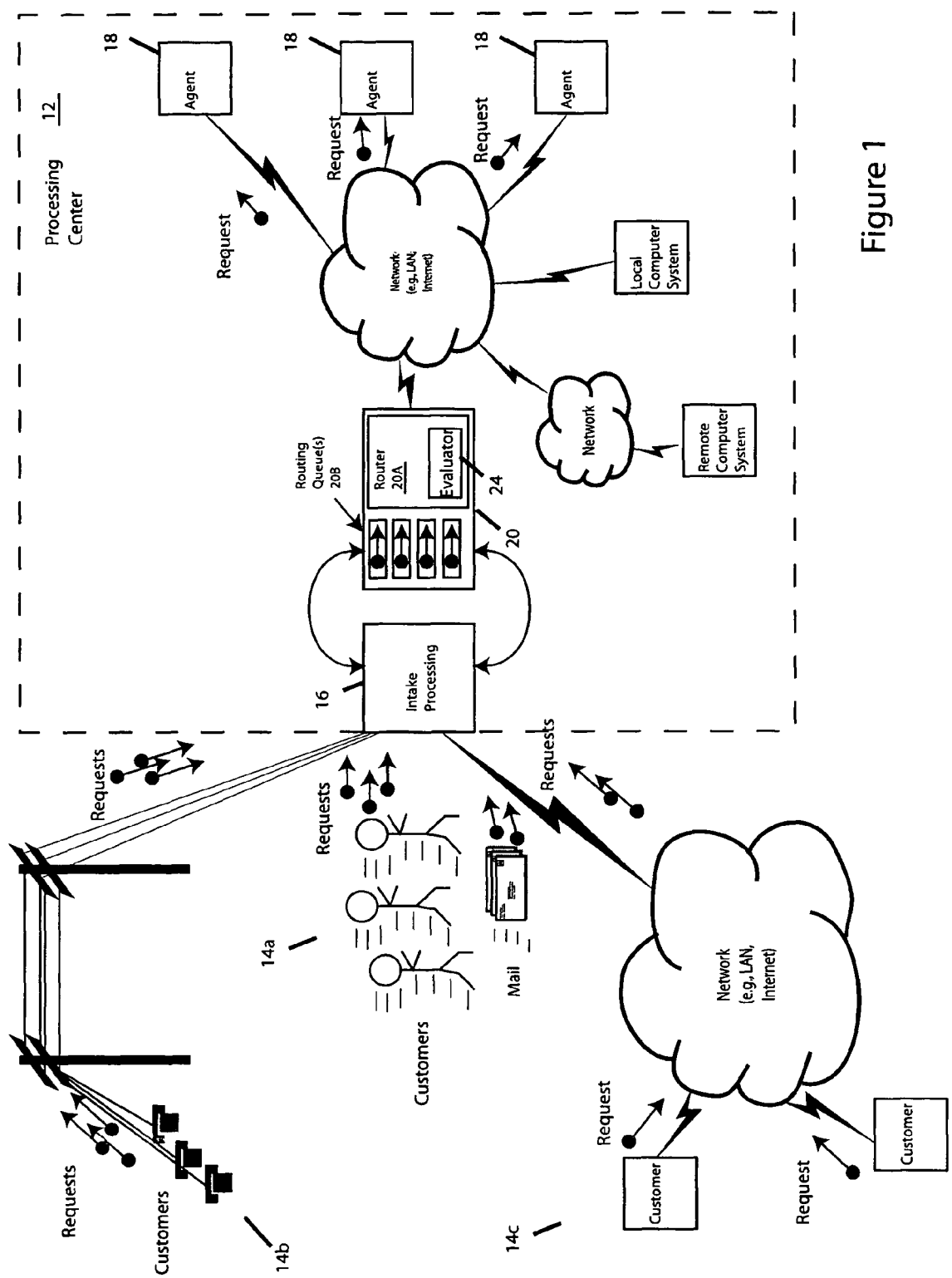
FIG. 1 depicts a digital data processing, communications and business environment of the type in which the invention is practiced.

FIG. 1 depicts a digital data processing, communications and business environment of the type in which the invention is practiced. In the illustration, a processing center 12 receives requests from customers 14, including those 14a visiting the center 12 in person, those 14b placing requests by telephone or mail, and those 14c making requests via computer (e.g., over a network, a bulletin board or otherwise).

The processing center 12 can be any service provider or other person, business or entity that utilizes work item routing (or, in the illustrated instance, request routing). Non-limiting examples include retailers, mail order houses, professional service providers, counseling centers, and "help" bureaus, and so forth. A common characteristic among these is that they field one or more work items (e.g., requests) for processing by one or more resources (e.g., service agents).

Illustrated "customers" 14 represent any persons, businesses, entities or other sources of work items (or, in the illustrated instance, requests) or to which work items (e.g., requests) are attributable. In the case of a service provider, such as a help bureau, work items can be, by way of non-limiting examples, requests from callers for assistance. In the case of a mail order house, work items can be requests from customers for goods. In the case of a professional service provider, work items can be requests from clients for services. Of course, it will be appreciated that, in any given embodiment, customers 14 may have access to the service center 12 other than via the illustrated mediums.

Illustrated requests represent any "work items" requiring routing (or assignment). In the illustrated embodiment, these are requests that will be processed by employee-agents 18. In other embodiments, they can be other items of information requiring routing/assignment to other resources of the processing center 12.

Agents 18 represent any resources to which items can be routed and/or assigned. In the illustrated embodiment, these are employee-agents of the service center 12. In other embodiments they may represent other persons, businesses and/or entities to which work items are assigned and/or routed for processing.

Turning back to the drawing, requests or other work items received by the processing center 12 are initially processed by intake processing personnel and/or apparatus 16. These can include call operators, receptionists, automated phone answering equipment, web servers, or otherwise. Intake processing 16 comprises identifying, evaluating and/or augmenting incoming work items—e.g., in the illustrated embodiment, requests and the customers to which they are attributable. This also includes encoding the work items in a preferably common format for routing by a routing system 20 described below.

By way of non-limiting example, intake processing 16 at a retailer can include a combination of telephone operators, customer order desk personnel and web site servers. Order requests received by each of these can be categorized and encoded as "work items" requiring fulfillment by warehouse and back-office personnel 18.

Routing system 20 represents digital data processing apparatus, e.g., a workstation, mainframe, embedded processor or other processing device, that routes and/or assigns work items placed in routing queue(s) 20B to resources. The operation of the routing system 20 is described below. Although the illustrated embodiment shows intake processing as being separate from routing system 20, those skilled in the art will appreciate that intake processing may utilize or may itself include, or be part of, system 20, e.g., as indicated by the double arrows connecting elements 18 and 20.

The Routing Problem

The routing problem starts with a set of work items and a set of resources. The problem is to assign resources to work items in an optimal way, subject to constraints based on detailed information about the resources and work items. Exactly what "optimal" means will vary greatly depending on the details of a particular application, and can be expressed in a variety of ways, as will be discussed. For example, in some applications, the most important priority may be to minimize the number of work items that are past due, whereas in other applications, efficient use of resources may be most important.

Queue Configurations

Figure 2:
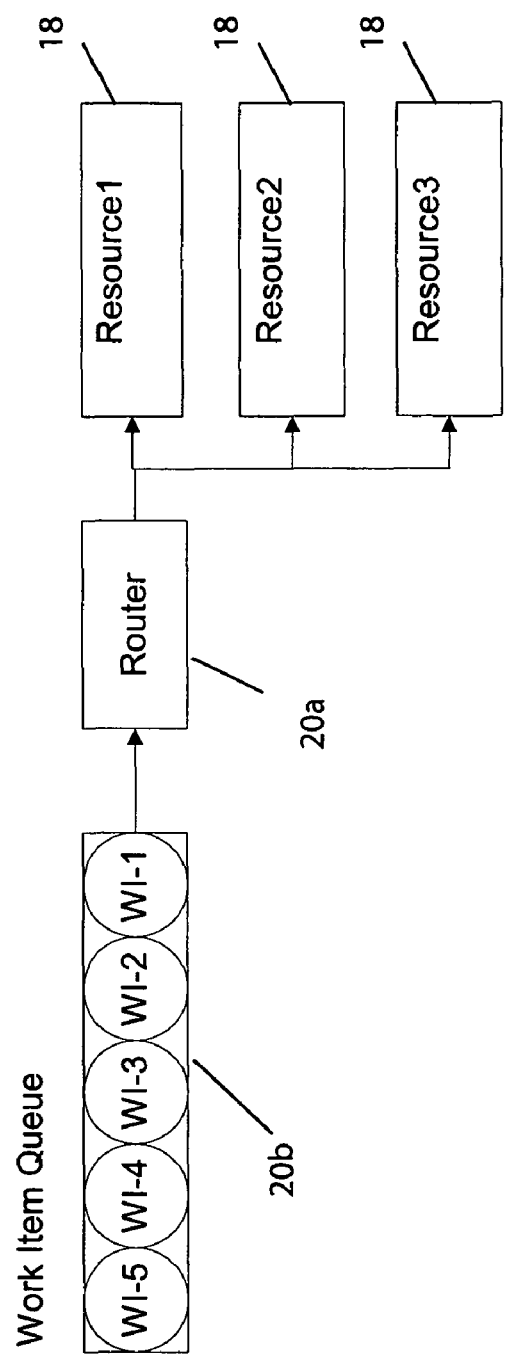
FIG. 2 depicts a simple work item queue from which a router makes assignments to a set of resources.

Work items appear to the router in one or more queues 20B, the configuration of which can have an important effect on the kind or routing that can be done. The simplest case is a single queue where work items are processed, one at a time, in a first in, first out (FIFO) sequence, as shown FIG. 2.

In such a simple case, the router 20A has relatively little information upon which to base decisions, because it considers only the next work item, not all the work items in the queue. The best it can do is dispatch the work item to the next available resource (e.g., 18A) that is capable of performing the work.

Figure 3:
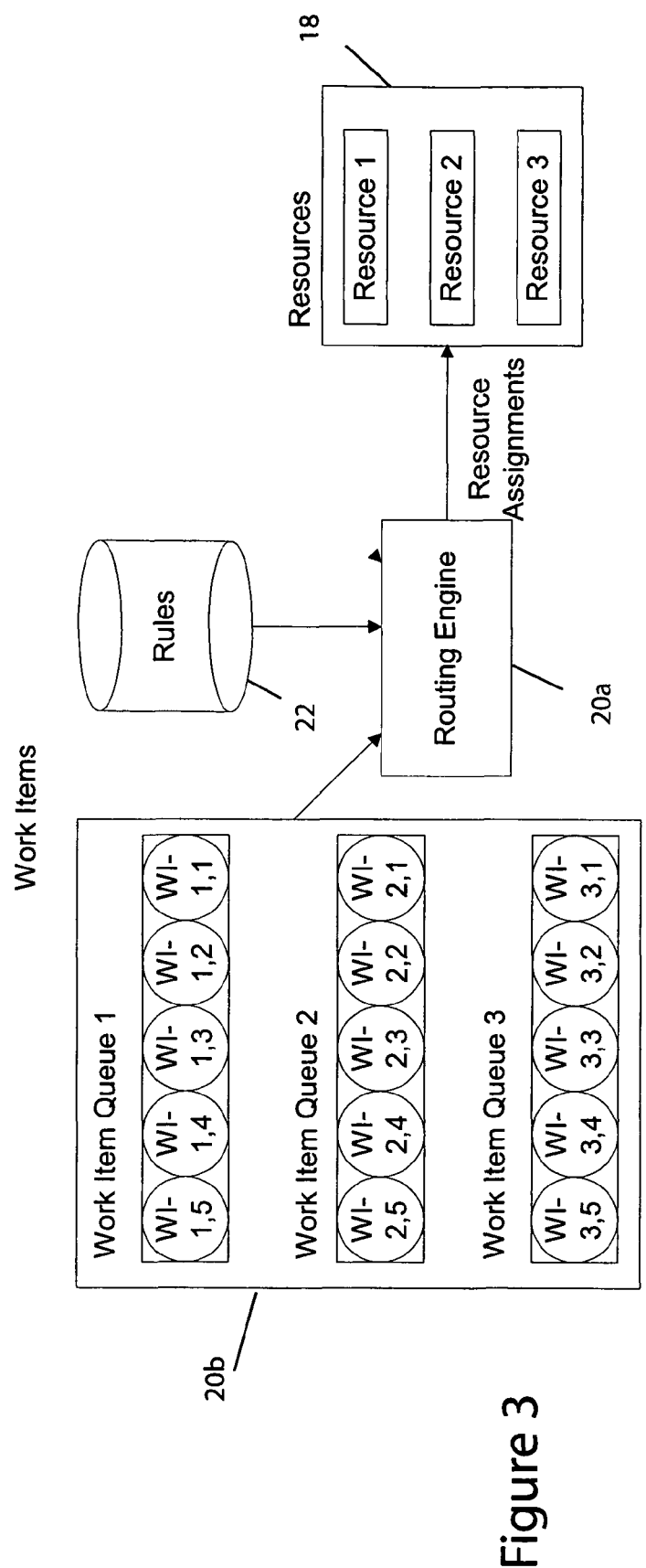
FIG. 3 depicts a routing system according to the invention with multiple parallel work item queues feeding a routing engine which makes assignments to resources based on rules in a rule base.

A more sophisticated system has parallel queues, as shown in FIG. 3. In this situation, the router 20A can consider the next work item from each of the queues 20B simultaneously. This allows for potentially significantly better resource assignment decisions. The "best" case is one where the router 20A has access to requirements information for as many work items as possible. For example, if the router can consider the first n work items in each of the queues, it can make the best decisions possible for all of those work items. By considering an entire set of work items at once, and an entire set of resources at once, the router will avoid the mistake of assigning a resource to the first work item when it may be better utilized for a subsequent work item. The criteria for making resource assignments are specified by rules, shown in database 22. These rules match detailed information in the work items and resources, and provide information about relative fitness of a match.

Work Item and Resource Detailed Information

As mentioned previously, the fitness of a particular resource assignment depends on detailed information about the corresponding work item and resource. The representation of this information will be discussed next. After this, the details of the algorithms will be given.

Representation of Skills

In the illustrated embodiment, a skill is represented as a pair of skill name (a string) and proficiency (an integer). Examples of this representation, e.g., useful in a assigning administrative tasks, e.g., to a clerical services processing center, are:

| | |
|---|---|
| Verbal French | 5 |
| Written French | 2 |
| Typing | 8 |
| MS Word | 9 |
| MS Excel | 6 |

Those skilled in the art will appreciate that though the illustrated embodiment utilizes this simple pairing of a skill name expressed as a string and proficiency level expressed as an integer, other embodiments may use alternate mechanisms as well. For example, the skill could be implemented as a database record with multiple fields, one of which is the skill name, and one of which is the skill level. Skill level itself need not be limited to integers; real numbers, or enumerated set values could be used.

Representation of Skills in Resources

In the illustrated embodiment, each resource (e.g., agent 18) has three sets of skills: preferred skills, secondary skills, and tertiary skills. Preferred skills are the skills that are most consistent with the job function of the resource. Secondary and tertiary skills are ones the resource has, possibly from previous job functions, that are not part of the resource's current job function. For example, the preferred skills for a manager would be managerial duties. Secondary skills might include skills normally associated with the manager's subordinates. Tertiary skills might be skills obtained from a previous job.

Note that, in the illustrated embodiment, the dimension of preferred/secondary/tertiary is orthogonal to that of skill level. Thus, this representation allows for preferred skills that have lower skill levels than secondary skills (even though this is unlikely in practice).

The preferred/secondary/tertiary dimension can be generalized to be an integer in order to allow for more than three levels of preference. A skill is then represented as a triple of name, proficiency level, and preference level. In the following discussion, however, the preferred/secondary/tertiary is used.

Representation of Skills in Work Items

In the illustrated embodiment, each work item has two sets of skills: desired skills and required skills. For work items, the skill level integer represents the minimum level needed.

Either the desired skills, or the required skills, but not necessarily both, have to be fulfilled by a resource assigned to this work item.

Representation of Service Level

In the illustrated embodiment, service level is represented, within a work item, as a triple of name, absolute time, and priority rating.

Examples of service levels are:

| | | | |
|---|---|---|---|
| First Deadline (Goal deadline) | Jan. 26, 2001 | 9:00 | 1 |
| Second Deadline (Due Deadline) | Jan. 29, 2001 | 9:00 | 100 |
| Past Deadline | Feb. 2, 2001 | 20:00 | 10000 |

Service levels are concatenated into lists that are associated with work items. For example, the three example service levels above might be sequenced together to express the service level requirements for a particular work item. Such a sequence can be thought of as the "order" for a work item. Note that the dramatic increase in priority rating represents escalation of the work item's urgency as it becomes past due. In addition to changing resource assignments as that urgency increases, a system according to the invention can cause additional, secondary work items related to the primary work item to be invoked and/or cancelled.

Service level information in (or derivable on behalf of) a work item may be derived from rules, from manual inputs, or otherwise. Service level symbols or names (e.g., "Gold Service") may be used to facilitate this. The rules may specify the information in a more convenient form than that shown above. For example, rules can be used to specify relative times as well as absolute ones. Thus, rules may specify an absolute date for the goal service level, and cumulative offsets for subsequent service levels. Similarly, rules may specify absolute or additive (incremental) values for the priority ratings. Rules may also specify arbitrary expressions for both time and priority rating components. This allows these values to become functions of any other variable in the system.

Routing Algorithm Details

The illustrated router 20a uses a routing algorithm to evaluate the fitness of individual work-item/resource assignments, and to evaluate combinations of these assignments, attempting to pick that combination which maximizes overall fitness. This functionality is represented in the drawings by evaluator module 24.

Fitness of Resource Assignments

Figures 5, 6:
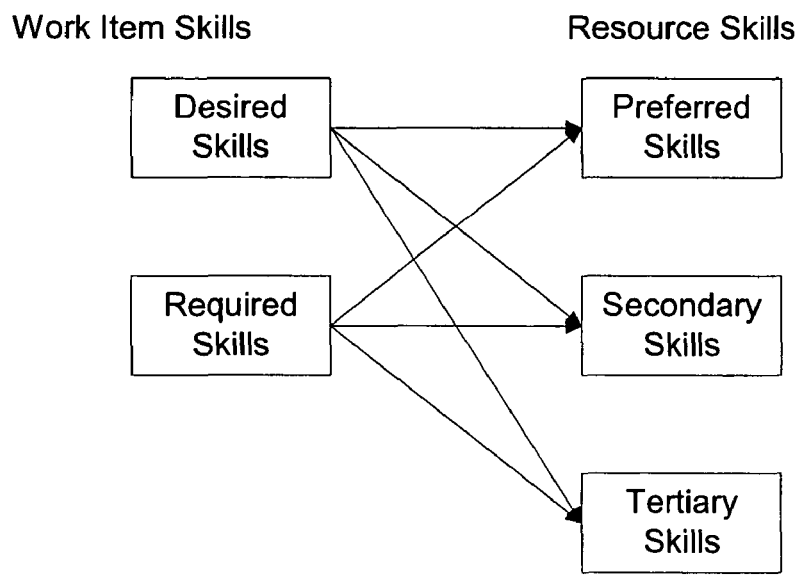
FIG. 5 depicts a matching of skills required or desired in a work item with skills provided by a resource in a system according to the invention.
FIG. 6 depicts the resource assignment cost matrix in a system according to the invention.

A "resource assignment" is the assignment of a particular resource to a particular work item. The fitness of a resource assignment is a measure (e.g., numerical value or grade) that is a function of skill information for the work item and resource. Thus, an assignment that has a good match of skill required by a work item and provided by a resource will have a higher fitness level. This sort of skill matching is depicted in FIG. 5.

Fitness is also a function of the service level of the work item. For example, let's assume the above-described service level sequence (goal, deadline, past deadline). Suppose that the required skills are language proficiency in French or German. The resource pool may include individuals with native language proficiency in one of these languages. Such individuals are a subset of all individuals with good proficiency in one of these languages. Finally, there may be some resources that have a low, but acceptable, level of proficiency (exchange students, for example). The individuals with native language proficiency would include this proficiency in their preferred skills. Other individuals would include their proficiency in their secondary skills, with an appropriate skill level.

Continuing this example, suppose that the current time precedes the goal deadline. In this case, resources that have preferred skills that match the work item's desired skills are given a high fitness. Thus, the native French or German speakers would be considered, but the other resources might not be, even though they have a certain level of proficiency. Suppose now that the work item isn't completed and the current time now falls between the goal deadline and the due deadline. At this point, more resources have to be considered, so resources that have preferred or secondary skills matching the work item's desired or required skills are given a high fitness. Thus, the non-native French or German speakers would now be included in the pool of resources to consider.

Finally, suppose that the work item is past due (or it is estimated that the job will not be completed until it would be past due). At this point, it might be best to apologize to the customer, and defer the work item. To compensate the customer for the delay, the deferred work item might be assigned to special resources by including skills that are not on the preferred list. For example, the work item might be assigned to a manager who knows the customer personally, and who happens to be extremely proficient in French.

The pool of resources available for assignment to any given work item may vary, not only as a function of the stress of that item and/or of the individual resources, but also as a function of all pending work items and all available resources. Future work items (and resources) may factor in as well. This is captured in the cost function z, discussed below, which determines the optimal assignment of work items to resources.

Take, for example, embodiments that increase pool size, as work item stress increases, by making available resources with required skills (as well as desired skills). In some such situations, a larger pool of resources with skills matching the work item's required skills is not utilized until the work item falls past the goal and/or due deadlines. However, if the result of the cost function can be lowered by doing so, then indeed the larger pool will be utilized even though the work item is not past due. This can happen, for example, in situations where assignment of predicted future work items—as well as of existing work items that are not imminently due—are considered during optimization.

Thus, fitness is always a function of a resource and a work item. Specifically, it is a function of the service level of the work item (current priority), and the skill information in the resource and work item. The fitness number approach allows for a declarative specification of the "cost" or "optimality" of a decision made by the routing algorithm. The cost value of a particular solution is the sum of the fitness of all the assignments of resources to work items. Note that this does not dictate a particular algorithm for routing; it merely provides a cost evaluation function that allows the routing algorithm to evaluate the optimality of its decisions.

Fitness functions can be expressed using rules or tables. This allows for a very flexible way to specify escalation, as in the above example.

Level of Stress in a System

Two very useful metrics for how the system is performing are deadline stress and resource stress. Deadline stress is defined as the percentage (or other measure or characterization) of work items that are past deadline. Resource stress is defined as the percentage (or other measure or characterization) of resources utilized.

Partitioning (segmentation) according to work item or resource characteristics is possible. This is just a filtered query of the overall set of work items or resources. Typically, the characteristic being filtered is a desired or required skill of a work item, or a preferred or secondary skill of a resource. For example, the set of all work items requiring the "Verbal French >3" skill would be such a filter. This allows for stress metrics for a particular restricted group (partition) of work items or resources.

Note that the stress metrics are just metrics; they are typically not used for resource assignment decisions. Resource assignment decisions are made by the router 20a based on the fitness ratings described above. The stress metrics give a good overview of what is going on in the system, and thus are useful for higher-level management decisions (whether to allocate overtime, hire temps, etc.). The stress metrics can be stored so that they can be analyzed over time. This might reveal trends important for resource planning.

Those skilled in the art will appreciate that deadline stress and resource stress are but two factors that can be used in assessing system performance. Other embodiments of the invention may use these and/or other assessments of system performance in evaluating a fitness of skills required by a work item and skills provided by a resource.

Safety Valves

What does the system do when work items go past deadline? One "safety valve" has already been mentioned above; when a particular work item's service level reaches a certain priority (usually associated with being past deadline), the fitness ratings of potential resource assignments for that work item are adjusted so that a larger number of resources may be considered (see previous discussion).

If this does not solve the problem, the system goes into deadline stress. A problem formulation where a cost penalty for unassigned work items is subtracted from the overall value of the solution allows the router 20a to account for this situation. Thus, the routing algorithm strives to find solutions that minimize the number of un-assigned work items. If the best solution has un-assigned work items, then the problem exists.

An enhancement to the problem formulation allows the system to not only indicate that there are un-assigned work items, but also to predict when they might be done. Here, the routing algorithm assigns resources not just for the current time, but over some finite time horizon. This capability to estimate when work items will be done allows the system to also estimate when resources will become available. Because such an algorithm schedules things in the future based on current assumptions, and because these assumptions may change, the schedule generated at any time may have to be adjusted in the future. This more sophisticated kind of router 20a is better because the cost penalty is a function not only of the number of un-assigned work items, but also, the extent to which they are late. This allows for more sophisticated trade-off decisions between getting a job done earlier with a less than ideal resource vs. getting it done later with an ideal resource.

An alternate embodiment estimates when resources will become available for further assignment. This can be based on pre-coded or past recorded information regarding each resource's schedule, as well as on estimation of the time when each resource will complete a prior assignment. As above, the routing algorithm takes these estimates into account when making new assignments.

Figure 4:
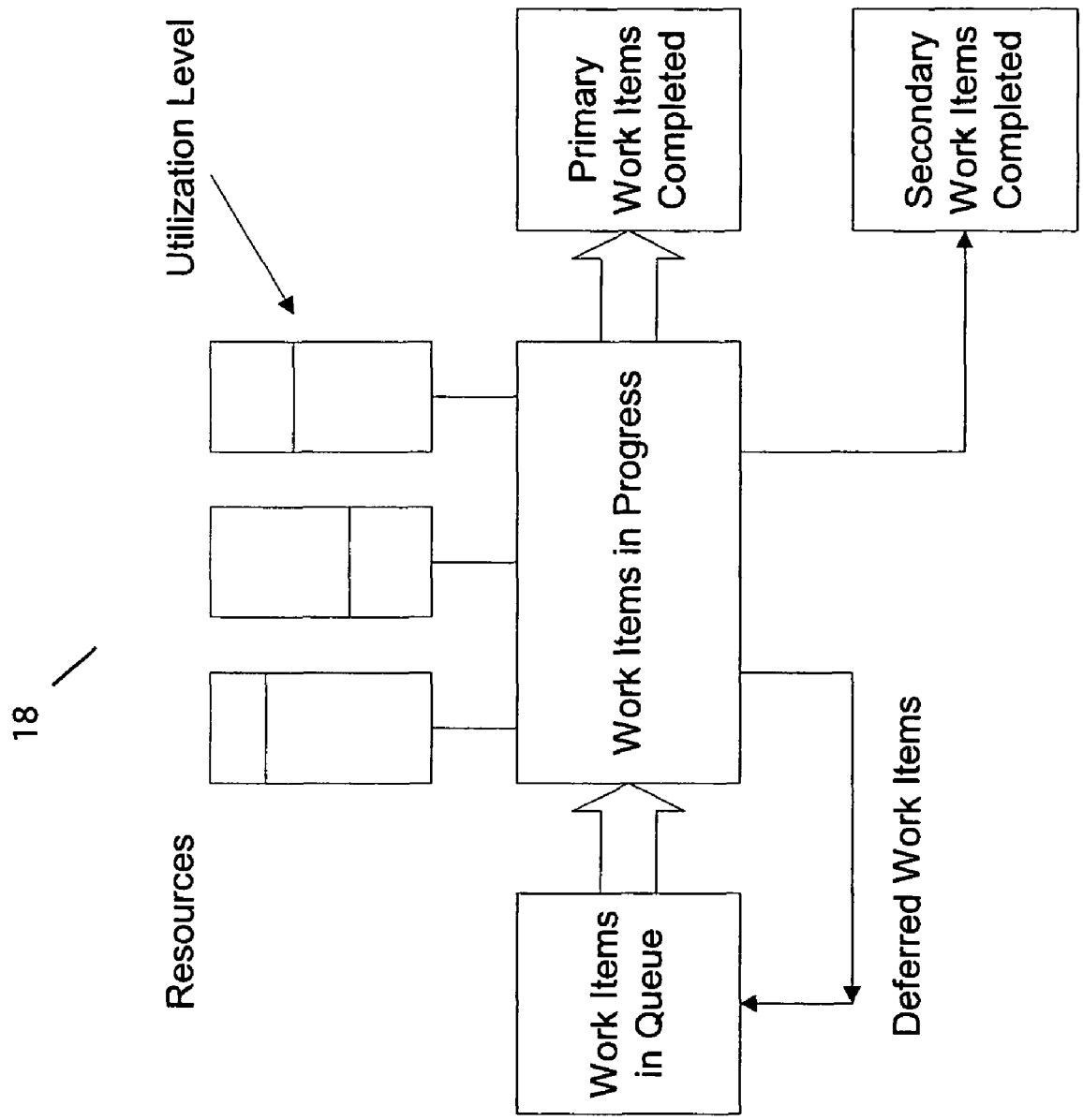
FIG. 4 depicts a routing process according to the invention that utilizes secondary work items to defer primary ones, and in which resource is used as an indication level of stress in the system.

This sort of trade-off suggests an additional safety valve. Any work item can optionally have a secondary work item that may be performed as a "delaying" action when the work item is deadline-stressed. For example, it is often the case that a customer would prefer a scheduled interaction (at some later time) to waiting for a half hour in a queue. Thus, the router 20a has the option of assigning a resource to the secondary work item and leaving the primary work item un-assigned (or assigned to an imaginary resource, in the case of certain routing algorithms). Whether this is actually done is up to the router 20a which makes its decision based on the various cost trade-offs. This process is depicted in FIG. 4.

The representation of the secondary work item includes all types of information that the primary work item has. For example, the secondary work item has its own set of desired and required skills.

Detailed Problem Formulation

Problem formulation involves translating the information in the work items, resources, and associated rules into a form that allows for efficient solution by the routing algorithms. Many resource assignment algorithms require the problem data to be in a very specific format, so correct problem formulation is crucial to good performance.

A general resource assignment problem can be stated mathematically as shown in the following way:

Let $x_{ij}=1$ if resource i is assigned to work item j $x_{ij}=0$ otherwise      Eq. 1 and $c_{ij}$ be the cost of assigning resource i to work item j then the optimal solution is obtained by minimizing z where $$z = \sum_i \sum_j c_{ij} x_{ij} \qquad \text{Eq. 2}$$

subject to the constraints $$\sum_i x_{ij} = 1 \qquad \text{Eq. 3}$$

$$\sum_j x_{ij} = 1$$

This sort of problem formulation is compatible with an important class of resource assignment algorithms. The algorithms are based on linear programming, but are much more specialized for resource assignment, and are therefore much faster than general linear programming at finding an optimal assignment solution. This class of algorithms includes the well-known "Hungarian" algorithm for resource assignment.

The goal is thus to transform the previously described information residing in work items, resources, and associated rules into the mathematically precise formulation of Eqs. 1-3. The first step is to compute the resource assignment cost matrix; the $c_{ij}$ values in Eq. 2 above. Such a matrix is depicted, by way of example, in FIG. 6. These costs are just the negative of the fitness ratings described above. Specifically, for every potential resource assignment (for every work item, and then for every resource that may be assigned to that work item) the fitness rating must be computed. As discussed above, fitness is a function of work item and resource properties. This can be expressed as fitness=$f$(workitem.service_level, workitem.desired_skills, workitem.required_skills, resource.preferred_skills, resource.secondary_skills, resource.tertiary_skills)      Eq. 4

This sort of function may be expressed using a combination of data tables and rules. The rules access the data tables to compute the overall fitness. For example, suppose that the fitness function calculator begins with a work item's desired skills. The calculator iterates over these skills, calling the following function for each skill:

skillmatch(workitem_skill, workitem.service_level, resource)

This function returns a number indicating how well the resource matches the skill. Thus, if the resource does not have the skill at all, this function would return 0. Otherwise, it would return a number based on whether the skill is preferred, secondary, or tertiary in the resource, and on the work item service level. Computation of this number could be based on a table, as shown in FIG. 7.

The skillmatch numbers for all desired or required skills are multiplied together to get an overall fitness. Thus, if any are 0, the overall fitness is 0, indicating that the resource does not provide all the skills needed by the work item.

After the overall fitness for each potential resource assignment has been computed, the resource assignment cost matrix ($c_{ij}$ values in Eq. 2) is known.

In addition to the fitness ratings, it is useful to represent the notion of work item priority, lateness, customer importance and/or risk in the cost function. This allows the routing algorithm to prioritize important work, and to trigger secondary work flows when appropriate (see previous discussion on safety valves). The key issue here is what to do when there are not enough resources to assign to all the work items. For the benefit of the routing algorithms, it is useful to introduce the concept of a "dummy" resource; an imaginary resource that represents no work for the work item. Assignment of such a resource results in a negative fitness rating; a penalty. The penalty is proportional to the service-level priority of the work item. Thus, the resource assignment cost matrix includes potential resource assignments to dummy resources with associated negative fitness ratings (or positive costs).

This representation can be extended to incorporate secondary workflows by simply adding the secondary work items to the resource assignment cost matrix right at the beginning. An additional constraint must be added that states that real (non-dummy) resources cannot be assigned to both a primary work item and its associated secondary work item. This can be expressed mathematically as shown in Eq. 3.

An important point with this overall formulation is that although it represents the notion of work item lateness using work item priorities and service levels, it does not explicitly predict when work items will get done. Such a prediction capability is possible to implement, but this leads to a general scheduling problem over some finite time horizon. This is much more complex than a resource assignment problem. Thus, the trick is to avoid turning this into a scheduling problem, but to retain the ability to defer work items in an intelligent way.

Those skilled in the art will appreciate that though the illustrated embodiment utilizes the mathematical formulation given in Eqs. 1-3, other embodiments may use alternate mechanisms as well. For example, fitness values returned by eq. 4 may be utilized by local dispatching algorithms that don't necessarily attempt to find a global optimal solution. Such algorithms may use simple heuristics, combined with the fitness values, to make fast, simple decisions that are not necessarily globally optimal, but are adequate for the application.

Routing Algorithms
Simple Algorithms

The fitness function methodology greatly simplifies the work of the routing algorithms. Consider the first queue configuration case where there is a single work item that must be assigned to one of a set of resoures. The fitness of each potential resource assignment is evaluated. The routing algorithm then just picks the resource assignment with the best fitness.

The problem is similar for the case when there is one resource and a set of work items that must be assigned. The decision here is which work item to assign to the resource next. As with the previous case, each potential resource assignment is evaluated, and the best one is chosen.

Multiple Resource Assignment Algorithms

The simple algorithms are simple because they only make one resource assignment at a time. The situation becomes quite a bit more complicated when there are m resources and m work items to be assigned. Now, there is a large combination of possible resource assignments. The first step is, for every work item, evaluate the fitness of every possible resource assignment. This results in an m×n fitness matrix, where m is the number of work items, and n is the number of resources. The next step is to consider various combinations of resource assignments and pick the best one. Theoretically, every such combination of resource assignments must be considered. The overall cost value is then the sum of all the fitness values in the combination, as stated mathematically in Eq. 2.

Note that the problem can easily be extended to handle the case of more work items than resources, or more resources than work items. Also, work items needing more than one resource can be handled by breaking such work items into separate work items, each requiring only one resource.

The exhaustive evaluation of all combinations of resource assignments would be prohibitively expensive for all but the smallest problems. Fortunately, there are good algorithms that achieve the optimal solution but without exhaustive evaluation. One such algorithm that is particularly well suited for this sort of problem is called the "Hungarian" algorithm.

The Hungarian method, as described, for example, in Kuhn, "The Hungarian Method For The Assignment Problem," Naval Research Logistics Quarterly, 2 (1955), pp. 83-97, is analogous to the simplex method for general linear programming, but is so specialized that there is very little resemblance. The Hungarian method is also much faster for assignment problems than the simplex method. The previously described problem formulation which results in a cost matrix and in Eqs. 1-3 provide a preferred input to the Hungarian method.

Thus, although the formulation does not restrict the type of solution algorithm used, it is suitable as input to an important, well-known class of optimization algorithms that solve assignment problems quickly and efficiently.

Those skilled in the art will appreciate that though the illustrated embodiment utilizes the Hungarian method, other embodiments may use alternate mechanisms as well. For example, a dispatching algorithm that combines heuristics with fitness values may be a viable alternative in many applications.

Depicted below is the equation for the primary-secondary work item constraint which is used in problem formulation. Particularly, for any primary work item j and associated secondary work item k, $$\sum_{i_{real}} x_{i_{real}j} + \sum_{i_{real}} x_{i_{real}k} \le 1 \qquad \text{Eq. 5}$$

Described above are methods and systems that achieve the desired objects. Those skilled in the art will appreciate that the illustrated embodiment is only one example of the invention and that others, incorporating modifications thereto, fall within the scope of the invention. Thus, by way of non-limiting example, it will be appreciated that work items can require any variety of skills or their analogs, in addition to or instead of those described above. Likewise, resources can provide any variety of skills or their analogs. Moreover, it will be appreciated that any variety of stress metrics can be utilized to reflect the stress of the system, in addition to or in place of those described above. In view of these and other modifications, what we claim is:

The invention claimed is:

1. A computer implemented method of making one or more resource assignments by assigning a work item to one or more resources from a set of plural resources, the method including the steps of
   evaluating by a computer a fitness of one or more skills any of required or desired by the work item with one or more skills provided by each of the plural resources, where the evaluation is a function of
   (a) a similarity between the one or more skills any of required or desired by the work item and the one or more skills provided by each resource, and
   (b) a stress factor, where the stress factor is a measure reflecting a completion status of the work item with respect to at least one deadline associated therewith, and/or of a level of stress on any of
       (i) one or more work items,
       (ii) one or more resources, and
   assigning by a computer the work item to a resource selected from a pool of resources each having at least a selected fitness, wherein as a result of said evaluation of said function, the size of the pool of resources having at least the selected fitness changes as the stress factor varies such that the size changes from any of:
   a smaller pool having resources with both the required and desired skills to a larger pool with at least required skills, or
   a larger pool with at least required skills to a smaller pool having both the required and desired skills.

2. A method of claim 1 for assigning plural work items to one or more resources, comprising the step of optimizing assignment of the plural work items to the resources based on the fitnesses associated with each of those work items.

3. A method of claim 1, including the steps of:
   assigning to each of at least selected resources a skill level indicative of a proficiency of that resource with respect to a given skill, and
   wherein the evaluating step includes determining the fitness as an additional function of the skill levels assigned to the resources.

4. A method of claim 3, including the steps of
   identifying a skill level required by the work item for each of one or more required desired skills, and
   wherein the evaluating step includes determining the fitness as an additional function of the skill level required by the work item for each of one or more required skills.

5. A method of claim 1, including the steps of
   assigning to each of at least selected resources a skill level indicative of a proficiency of that resource with respect to each of a plurality of skills, and
   wherein the evaluating step includes determining the fitness as an additional function of the skill levels assigned to each of the selected resources.

6. A method of claim 5, including the steps of
   identifying a skill level required by the work item for each of one or more required skills, and
   wherein the evaluating step includes determining the fitness as an additional function of the skill levels required by the work item.

7. The method of claim 1, wherein said evaluating uses one or more stress factors including a work item stress factor and said size of said pool increases as said work item stress factor changes.

8. The method of claim 1, wherein said evaluating uses one or more stress factors including a work item stress factor and said size of said pool decreases as said work item stress factor changes.

9. The method of claim 1, wherein the work item assigned to the resource in said assigning is a first of multiple work items, and prior to said assigning, the method includes evaluating potential resource assignments for the multiple work items in combination, including determining costs associated with one or more potential resource assignments and determining an overall cost for combinations of potential resource assignments for the multiple work items.

10. A computer implemented method of making one or more resource assignments by assigning a work item to one or more resources from a set of plural resources, the method including the steps of:
    evaluating by a computer a fitness of one or more skills any of required or desired by the work item with one or more skills provided by each of the plural resources, where at least one resource has a preferred skill, the evaluation being a function of
    (a) a similarity between the one or more skills any of required or desired by the work item and the one or more skills provided by each of the plurality of resources, and
    (b) a stress factor, where the stress factor is a measure reflecting a completion status of the work item with respect to at least one deadline associated therewith, and/or of a level of stress on any of
        (i) one or more work items,
        (ii) one or more resources, and
    assigning by a computer the work item to a resource selected from a pool of resources each having at least a selected fitness, wherein as a result of said evaluation of said function, the size of the pool of resources having at least the selected fitness changes as the stress factor varies such that the size changes from any of:
    a pool of a first size, which pool has resources that at least provide a matching preferred skill, to a pool of second size, which pool has resources that provide at least one of the matching preferred skill or a matching secondary skill, or
    a pool of a first size, which pool has resources that provide at least one of the matching preferred skill or the matching secondary skill, to a pool of a second size, which pool has resources that at least provide the matching preferred skill.

11. A method of claim 10, including the step of assigning relative preference levels to each of a plurality of skills provided by a resource.

12. A method of claim 11, including the step of assigning primary, secondary and tertiary preference levels to skills provided by a resource.

13. A method of claim 10, including the steps of assigning to each of at least selected resources a skill level indicative of a proficiency of that resource with respect to a given skill, and wherein the evaluating step includes determining the fitness as an additional function of the skill levels assigned to the resources.

14. A method of claim 13, wherein the evaluation is a function of a level of stress on a system executing the claimed method.

15. A method of claim 14, wherein the evaluation of fitness of one or more skills required by at least one work item with one or more skills provided by at least one resource varies as a function of the level of stress on the system.

16. A method of claim 15, wherein the evaluation of fitness of one or more skills any of required or desired by at least one work item with one or more skills provided by at least one resource increases as a level of stress on the system increases.

17. A method of claim 16, wherein the evaluation of fitness of one or more skills desired by at least one work item with one or more skills provided by at least one resource increases as a level of stress on the system increases.

18. A method of claim 13, including the steps of
identifying a skill level required by the work item for each of one or more required skills, and
wherein the evaluating step includes determining the fitness as an additional function of the skill level required by the work item for each of one or more required skills.

19. A method of claim 10, including the steps of
assigning to each of at least selected resources a skill level indicative of a proficiency of that resource with respect to each of a plurality of skills, and
wherein the evaluating step includes determining the fitness as an additional function of the skill levels assigned to each of the selected resources.

20. A method of claim 19, including the steps of
identifying a skill level required by the work item for each of a one or more required skills, and
wherein the evaluating step includes determining the fitness as an additional function of the skill levels required by the work item.

21. A computer implemented method of making one or more resource assignments by assigning a work item to one or more resources from a set of plural resources, the method including the steps of
evaluating by a computer a fitness of one or more skills any of required or desired by the work item with one or more skills provided by each of the plural resources, where the evaluation is a function of
(a) a similarity between the one or more skills any of required or desired by the work item and the one or more skills provided by each resource,
(b) a stress factor, where the stress factor is a measure reflecting a completion status of the work item with respect to a deadline associated therewith, and
assigning by a computer the work item to a resource selected from a pool of resources each having at least a selected fitness wherein as a result of said evaluation of said function, the size of the pool of resources having at least the selected fitness changes as the stress factor varies such that the size changes if the work item is not complete when said deadline passes from any of
a smaller pool having resources with both the required and desired skills to a larger pool with at least required skills, or
a larger pool with at least required skills to a smaller pool having both the required and desired skills.

22. A method of claim 21, wherein the stress factor is based on a completion status of the work item with respect to a plurality of deadlines.

23. A method of claim 21, comprising assigning a first stress factor to reflect whether the work item has been completed by a first deadline, assigning one or more other stress factors to reflect whether the work has been completed by one or more other subsequent respective deadlines.

24. A method of claim 23, comprising assigning a first stress factor to reflect whether the work item has been completed by a first deadline or goal deadline, assigning a second stress factor to reflect whether the work item has been completed by a second deadline or due deadline, and assigning a third stress factor to reflect that the work item has not been completed by the due deadline.

25. A method of claim 21, including the steps of
assigning to each of at least selected resources a skill level indicative of a proficiency of that resource with respect to a given skill, and wherein the evaluating step includes determining the fitness as an additional function of the skill levels assigned to the resources.

26. The method of claim 24, wherein the pool is a first size in accordance with the first stress factor when the work item is not complete and a current time is at a first point in time prior to the first deadline, resources of said pool at said first point in time having at least a preferred skill matching a required skill of the work item, said pool having a second size larger than the first size in accordance with the second stress factor when the work item is not complete and a current time is at a second point in time between the first deadline and the second deadline, resources of said pool at said second point in time having at least one of a preferred skill or a secondary skill matching a required skill of the work item.

27. A computer implemented method of making one or more resource assignments by assigning a plurality of work items to one or more resources from a set of plural resources, the method including the steps of
evaluating by a computer for each of the plurality of work items a fitness of
(i) one or more skills any of required or desired by that work item, with
(ii) one or more skills provided by each of the plural resources, where the evaluation is a function of
(a) a similarity between the one or more skills any of required or desired by that work item and the one or more skills provided by each resource, and
(b) a stress factor, where the stress factor is a measure reflecting a completion status of at least one of the plurality of work items with respect to at least one deadline associated therewith, and of a level of stress on any of
(i) one or more work items,
(ii) one or more resources, and
optimizing assignment by a computer of the plurality of work items to the resources based on the respective fitnesses, where at least one of the plural resources is a delaying action, and wherein each of the plurality of work items is assigned a resource selected from a pool of resources each having at least a selected fitness, wherein as a result of said evaluation of said function, the size of the pool of resources having at least the selected fitness changes as the stress factor varies such that the size changes from any of:
a smaller pool having resources with both the required and desired skills to a larger pool with at least required skills, or
a larger pool with at least required skills to a smaller pool having both the required and desired skills.

28. A method of claim 27, comprising assigning a work item to the delaying action and to one or more other resources.

29. A method according to claim 27, comprising the steps of generating one or more further work items that correspond to a work item assigned to the delaying action, and assigning the further work items to one or more resources other than a delaying action.

* * * * *

UNITED STATES PATENT AND TRADEMARK OFFICE
CERTIFICATE OF CORRECTION

| | | |
|---|---|---|
| PATENT NO. | : 8,335,704 B2 | Page 1 of 1 |
| APPLICATION NO. | : 11/046211 | |
| DATED | : December 18, 2012 | |
| INVENTOR(S) | : Trefler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this
Eleventh Day of November, 2014

Michelle K. Lee
*Deputy Director of the United States Patent and Trademark Office*